United States Patent [19]
Sarfati et al.

[11] Patent Number: 4,478,375
[45] Date of Patent: Oct. 23, 1984

[54] CONVEYING DEVICE FOR CONTINUOUS THREADS

[75] Inventors: Alberto G. Sarfati, Busto Arsizio; Massimiliano Bianchi, Milan; Merate Riva, Pagnana di Merate, all of Italy

[73] Assignee: Sobrevin Société de brevets industriels-Etablissment, Vaduz, Liechtenstein

[21] Appl. No.: 287,329

[22] Filed: Jul. 27, 1981

[30] Foreign Application Priority Data

Aug. 19, 1980 [DE] Fed. Rep. of Germany ....... 3031260

[51] Int. Cl.$^3$ .................................... B65H 51/20
[52] U.S. Cl. .................................... 242/47.01; 310/105
[58] Field of Search ............... 242/47.01, 47.02, 47.03, 242/47.04, 47.05, 47.06, 47.07, 47.08, 47.09, 47.1, 47.11, 47.12, 47.13, 45, 47; 66/132 R; 139/452; 310/92, 103, 105

[56] References Cited

U.S. PATENT DOCUMENTS

| | | | |
|---|---|---|---|
| 1,702,755 | 2/1929 | Weydell | 310/105 |
| 2,119,819 | 6/1938 | List | 310/105 X |
| 2,488,827 | 11/1949 | Pensabene | 310/105 |
| 2,871,383 | 1/1959 | King | 310/105 X |
| 3,002,402 | 10/1961 | Howe | 310/105 X |
| 3,089,971 | 5/1963 | Wheeler et al. | 310/105 |
| 3,225,446 | 12/1965 | Sarfati et al. | 242/47.01 X |
| 3,411,548 | 11/1968 | Pfarrwaller | 242/47.01 X |
| 3,490,710 | 1/1970 | Muhlhausler | 242/47.01 |
| 3,796,386 | 3/1974 | Tannert | 242/47.12 |
| 3,798,929 | 3/1974 | Balgalvis | 242/47.01 X |
| 3,904,141 | 9/1975 | Rosen | 242/47.12 |
| 4,132,368 | 1/1979 | Schiess et al. | 242/47.01 |
| 4,349,161 | 9/1982 | Carlsson et al. | 242/47.01 |

*Primary Examiner*—Stanley N. Gilreath
*Attorney, Agent, or Firm*—Martin A. Farber

[57] ABSTRACT

Conveying device for continuous threads with a thread accumulator to which there is coordinated a brake mechanism, regulating the thread feed, and a coupling mechanism comprising an annular magnet (10) whose winding (9) is surrounded by a two-piece housing concentrating the magnetic field lines, one housing part (7) being rotatably mounted and permanently connected with the drive and forming a slot (11) relative to the other, stationary housing part (8), the slot width, in the peripheral direction, varying in uniform distribution, and into which slot there is inserted a ring (14) made of electrically conducting material, which ring is jointly rotatably connected with the power take-off axle (18).

11 Claims, 4 Drawing Figures

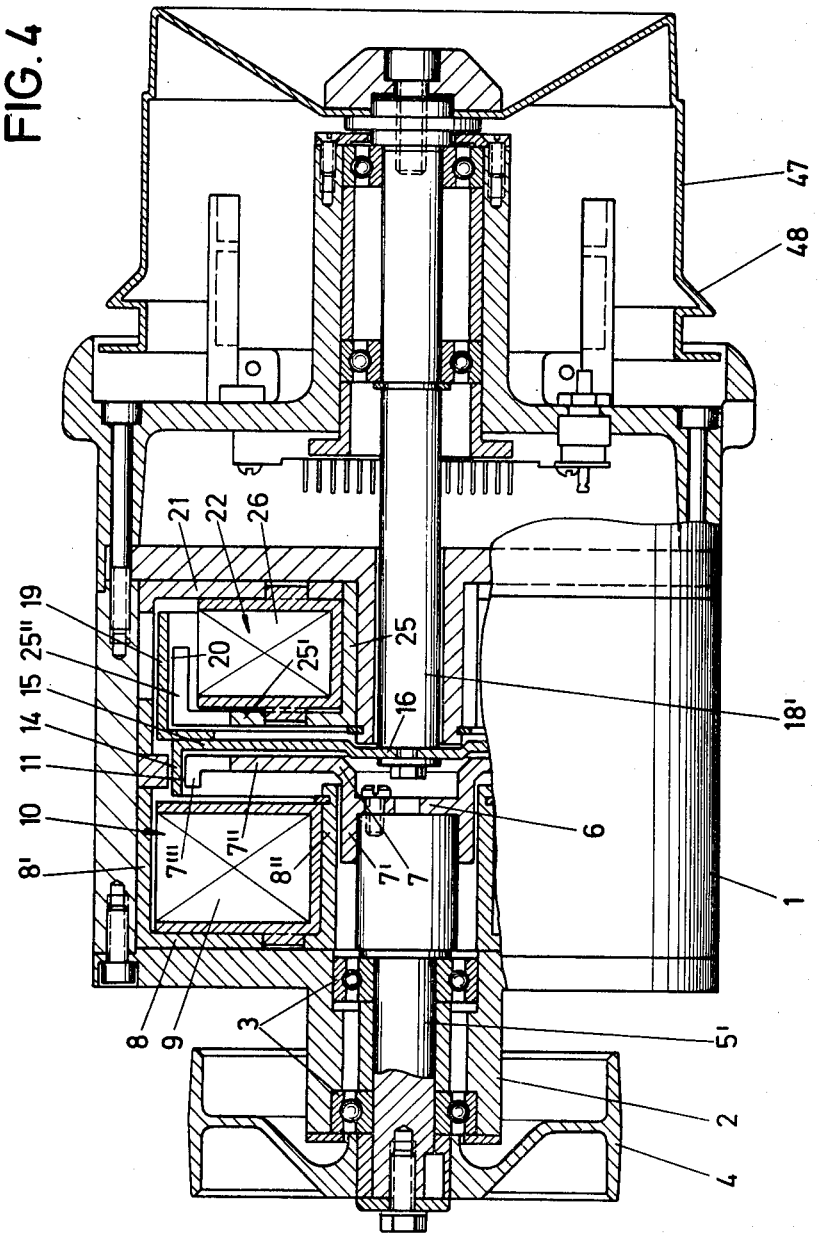

CONVEYING DEVICE FOR CONTINUOUS THREADS

The invention concerns a conveying device for continuous threads with an accumulator receiving several thread windings, the thread running tangentially to the accumulator and from which the thread is removed in the axial direction and to which a device is coordinated for regulating the thread feed from time to time only until reaching a certain number of thread windings respectively on the accumulator, the regulation device comprising a pick-up sensing device influenced by the thread windings of the accumulator, a brake mechanism for stopping the thread feed and a coupling mechanism connecting or disconnecting the continuously running drive to or from a power take-off axle carrying the thread winding part.

A conveying device of the aforesaid type is known in the market, by which the power take-off axle is placed in rotation over a spring-biased coupling disc. In parallel arrangement to the coupling disc, there extends a plate carrying an electromagnet, the electromagnets receiving the pulses from the pick-up sensing device to disengage the coupling disc and effect braking. This construction does not work without wear, which is caused by the coupling disc continuously engaging and disengaging during operation and interacting with other structural parts. Further, exact tolerances must be held to because of the coupling disc shiftable in axial direction, which is difficult to manufacture and increases the production costs. The thread output of such a conveying device, measured in meters per minute, does not then do justice to all requirements.

It is the object of the invention to develop a conveying device of the above set forth type which is technically advantageous to manufacture and assemble in such a way that, aside from a wear-free operating coupling mechanism, an increased thread output is attained.

A solution of this object is aided in the manner that the coupling mechanism comprises an annular magnet (10) arranged fixed in position concentrically to the accumulator axis, the winding (9) of the annular or coil magnet being connected to a voltage source being controlled by the pick-up sensing device (44) and being surrounded by a two-part housing (7, 8) which concentrates its magnetic field lines, one housing part (7) being connected permanently with the drive (5, 4) and rotatably mounted and forming a slot (11) with respect to the other, stationary housing part (8), the slot width, peripherally varying in uniform distribution, and a ring (14) made of electrically conducting material projects into the slot, the ring being jointly rotatably connected with the power take-off axle (18, 18').

As a result of such an arrangement, a conveying device of the introductory set forth type is provided of increased practical value. The coupling mechanism now works practically without wear. If the stationarily arranged annular magnet, concentric to the accumulator axis, receives voltage, then this leads, via the housing part which is connected fixedly to the drive, to the carrying along of the ring which is inserted between the slot and which is connected jointly rotatably with the power take-off axle. The varying slot width in this connection determines the alternating or changing field in the peripheral direction. Therefore, no structural parts to be shifted in axial direction of the accumulator are required, so that the installation tolerances are radially. These can be maintained more simply and exactly production-wise. The assembly is also simplified thereby. It was ascertained that the thread output exceeds the presently attainable 1,600 meters per minute with a sensitive manner of operation, this even with the quickest changing or variation of the rotation of the power take-off axle. If the accumulator is filled, then the winding of the annular magnet receives voltage by means of the pick-up device. If a predetermining thread winding length is found on the accumulator, then the voltage supply is disconnected by means of the pick-up device, whereupon the brake mechanism begins to operate.

An advantageous further development is in that the rotating and fixed housing part (7, 8) have partial sections (7', 8'') arranged overlapping one another.

It is found in this connection to be advantageous if the partial sections extend axially parallel. This precaution is advantageous with a plug-in assembly of the components of the conveying device. Along with a facilitated assembly, cost advantages result with maintenance or with possible repairs.

A space-saving, easy to assemble brake mechanism is attained by using the available components of the coupling mechanism in that, opposite to the ring (14) which projects axially parallel into the slot (11), there extends a second ring (19) made of electrically conducting material, which is inserted into a slot (20) which is formed by the fixed housing (21, 25) of a second annular magnet (22) arranged concentrically to the accumulator axle, and which has a slot width varying in the peripheral direction, the winding (26) of this annular magnet (22) which is controlled by the pick-up device, being connectable to a voltage source alternating with the winding (9) of the coil magnet (10) of the coupling mechanism. This means that, with an operating coupling mechanism, the winding of the coil magnet of the brake mechanism does not receive any voltage. If, on the other hand, the accumulator has reached the corresponding number of thread windings which lie next to each other, then the pick-up device disconnects the voltage supply for the winding of the coupling mechanism and connects the voltage supply for the winding of the brake mechanism, so that the retardation or deceleration of the power take-off axle occurs immediately.

It is found advantageous if the variation of the slot width is formed by teeth (12, 23) and tooth spaces (13, 24) at the peripheral edge of the radially outward extending side (7'', 25') of the one housing part.

In order to attain a reduction or increase in the number of rotations during the winding up of the thread onto the accumulator, a rotation (or rpm) counter is coordinated to the power take-off axle, which controls the power supply to the annular magnet (10) of the coupling mechanism.

Weight-saving and assembling advantages are attained when the ring (14) which enters into the slot (11) of the coupling mechanism is seated on a pot-shaped carrier (15), preferably made of light metal, which carrier is nested (stacked) into the rotating housing part (7) which is shaped geometrically similarly, whereby both parts in the area of their pot base (6 and 16, respectively) have the axle connection to the respective drive and power take-off axles.

Finally, an advantageous embodiment is that the teeth (12, 23), at their free end, have a bent portion (7''' and 25'', respectively) pointing in the direction of the annular magnet winding (9 and 26, respectively).

With the above and other objects and advantages in view, the present invention will become more clearly understood in connection with the detailed description of preferred embodiments, when considered with the accompanying drawings, of which:

FIG. 4 is a longitudinal section through the conveying device in accordance with the second embodiment with a rotating accumulator.

Figure 1:
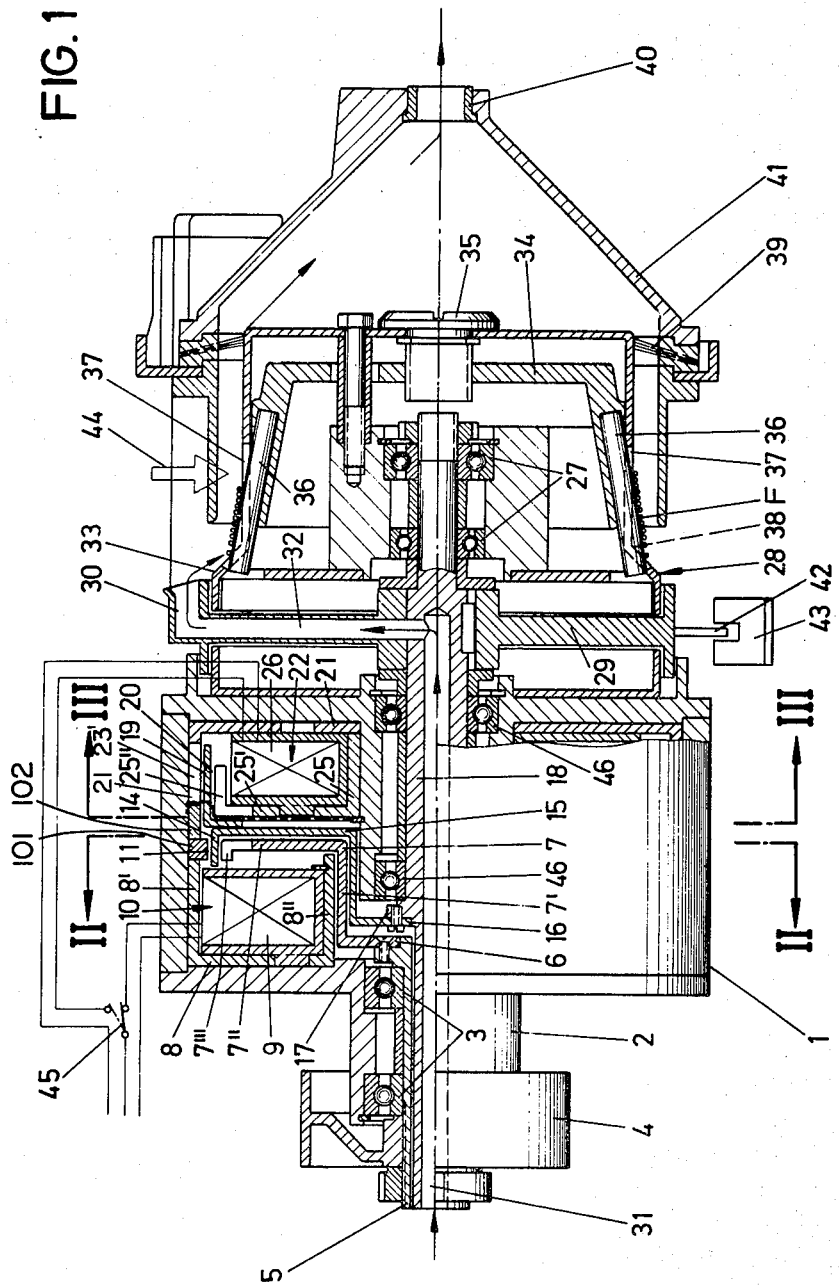
FIG. 1 is a partial longitudinal section through the conveying device in accordance with the first embodiment, which shows a stationary accumulator.
Figure 3:
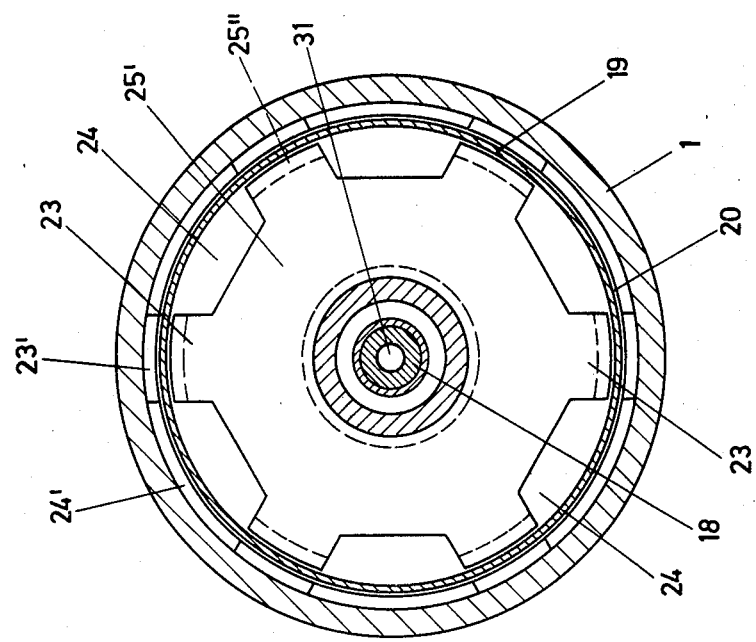
FIG. 3 is a section according to the line III—III in FIG. 1.
Figure 2:
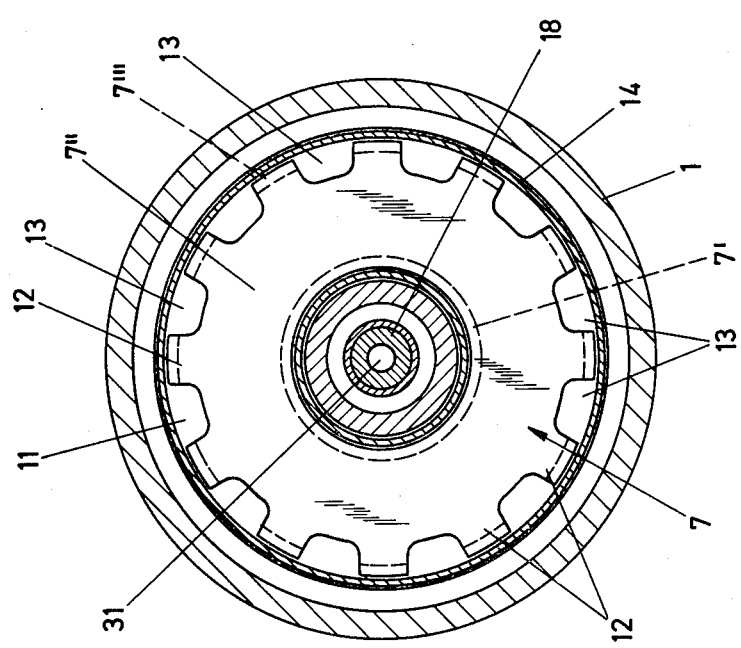
FIG. 2 is a section according to the line II—II in FIG. 1.

The conveying device according to the first embodiment has a cylindrical housing 1, which has roller bearings 3 in an inwardly set-off housing section 2. Seated in these roller bearings is a driving axle 5, formed hollow and carrying a driving disc 4.

The inner end of the driving axle 5 is connected with the radially directed pot base 6 of a rotating housing part 7. This housing part and a stationary housing part 8 along with a ring-shaped housing part 101, which housing parts are made of soft iron, surround a stationary winding 9 of an annular magnet 10, arranged concentrically to the driving axle 5. The fixed housing part 8 in cross section has a U-shape of such a type that the sides 8', 8" are parallel to the driving axle 5. The partial section formed by the side 8" and the section 7' of the rotatable housing part 7, parallel thereto, overlap while leaving a narrow annular slot therebetween, which slot is further defined by housing part 101. The radially outwardly extending side 7", bent relative to the section 7', has a bent portion 7"' pointing in the direction toward the winding 9.

Between the fixed housing part 8 and the rotatable housing part 7 spaced therefrom, an annular slot 11 is formed such that a variation of the slot width is formed by teeth 12 and tooth spaces 13 between the teeth at the periphery of the radially outwardly extending side 7" of the rotatable housing part 7. Into this slot 11 there projects a ring 14 made of electrically conducting material. For the ring, copper is preferably used. The ring 14 is seated on a pot-shaped carrier 15, made of light metal or alloy, which is stacked (nested) into the rotating housing part 7 which is formed geometrically alike (or complementary). In the area of its pot base 16, the carrier 15 is connected at a radially outwardly projecting flange 17 of and with the power take-off axle 18 which extends through the driving axle 5.

Mounted on the carrier 15 opposite to the ring 14 which projects axially parallel into the slot 11, is a second ring 19, the second ring 19 also being made of electrically conducting material. This ring 19 is inserted into an annular slot 20, which is formed by a fixed or stationary housing 21, 25, and ring-shaped housing part 102, of the second annular magnet 22 arranged concentrically to the power take-off axle 18, the housing (21, 25, 102) being made of soft iron. This slot 20 also has a slot width varying in the peripheral direction by means of teeth 23 and tooth spaces 24. The fixed housing is also formed in two parts in such a way that the radially outward pointing side 25' of one housing part 25 has a bent portion 25" pointing in the direction toward the annular magnet winding 26. Opposite the teeth 23 and tooth spaces 24 are teeth 23' and tooth spaces 24' of the other housing part 21.

The power take-off axle 18 is mounted in turn in roller bearings 46 of the housing 1. At its end remote from the drive, the power take-off axle 18 is set-off stepwise and is disposed in roller bearings 27 of an accumulator (thread storage) 28. The construction of the accumulator corresponds to that of German Patent No. 2,417,440. Arranged before the accumulator 28 is a thread eye carrier 29, which is keyed into or wedged onto the power take-off axle 18. At the end projecting over the accumulator 28, a thread eye 30 is located on the thread eye carrier 29. The thread to be wound onto the accumulator 28 passes through a bore 31 of the power take-off axle 18 and from there passes into a radial bore 32 of the thread eye carrier 29, which bore 32 passes into the thread eye 30. Leaving the thread eye 30, the thread winds up on a conical winding portion 33 of the accumulator 28, which widening portion continues into a cylindrical drum wall. Mounted in the accumulator 28 is a longitudinally adjustable carrier 34. A central screw 35 serves for its longitudinal adjustment. Bores are formed in the carrier 34 for the reception of studs 36 in uniform angular distribution which are inclined at an acute angle relative to the axial line of the accumulator axis, the latter being aligned with the driving axle and the power take-off axle. The studs 36 pass through corresponding slots 37 of the accumulator 28 and lie crosswise to the angular channel 38 of the accumulator. The thread layers F, therefore, come first of all to the conical widening portion 33 and then onto the studs 36 and surface wall of the accumulator 28. A brake ring 39, which surrounds the latter, is coordinated to the accumulator. The thread F leaves the conveying device through an eye 40 of the spout 41 concentrically surrounding the accumulator 28.

At the thread eye carrier 29, there is a radially projecting spike 42, which is coordinated to a revolution counter or tachometer 43.

The accumulator 28 has a pick-up (sensing) device 44 indicated by an arrow, which device is influenced by the thread windings F wound onto the accumulator 28. For example, the pick-up device 44 can be formed as a photoelectric detector which controls a switch 45.

The following operation results: As long as the thread windings F, wound up on the accumulator 28, do not influence the pick-up device 44, the switch 45 is in the position marked in FIG. 1 with solid lines. Hence, the winding 9 of the annular magnet 10 receives voltage. The ring 14, inserted into the slot 11 between the fixed housing part 8 and the rotating housing part 7 which is driven continuously by the driving axle 5, is thereby carried along by the bent portion 7"' without mechanical contact, the ring 14 by means of the carrier 15 rotating the power take-off axle 18. In turn the power take-off axle 18 moves the thread eye 30 around the accumulator 28. By means of the rotation counter 43, controlled by the spike 42 of the thread loop carrier, the power supply for the annular magnet 10 of the coupling mechanism can be controlled. If the number of thread windings reaches such an amount that the pick-up device 44 is influenced thereby, then the pick-up device switches the switch 45 into the position shown dash-dotted in FIG. 1. The winding 9 of the annular magnet 10 does not then receive any voltage. The winding 26 of the annular magnet 22 of the brake mechanism is then excited. By means of the ring 19 which is inserted into the slot 20 of the housing (between the housing parts 21 and 25), the deceleration of the power take-off axle 18 then follows. After removal of the thread windings on the accumulator, the change over switching can again take place. This is performed very sensitively and results in a quick change or alternation. The slot width in this connection determines the alternating field in the peripheral direction.

The construction of the coupling mechanism and the brake mechanism of the second embodiment shown in FIG. 4 corresponds to that of the first embodiment. Differing from this one, a drum-like accumulator 47 is mounted for joint rotation on the power take-off axle 18'. The thread feed does not occur with this embodiment example by means of the driving axle 5' and power take-off axle 18', but the thread is wound up tangentially (by a thread feed not shown) onto the accumulator in the area of its conical widening portion 48.

We claim:

1. In a conveying device for continuous threads comprising an accumulator receiving several thread windings, the thread running tangentially to the accumulator and the thread being removed therefrom in the axial direction and a regulation device coordinated to the accumulator for regulating the thread feed from time to time only until reaching a certain number of thread windings on the accumulator, the regulation device comprising a sensing device sensing the thread windings on the accumulator, a brake mechanism for stopping the thread feed, a continuously running drive, a power take-off axle carrying a thread winding part adapted to cooperate with the accumulator, and a coupling mechanism connecting or disconnecting said continuously running drive to or from, respectively, said power take-off axle, the improvement comprising a two-part housing, the coupling mechanism comprising an annular magnet arranged fixed in position concentrically to an axis of the accumulator, the annular magnet having a winding connected to a voltage source and to the sensing device for operating the coupling mechanism, and wherein the two-part housing encloses the annular magnet for concentrating magnetic field lines of the magnet, said two-part housing including a rotating housing part and a stationary housing part, said rotating housing part being rotatably mounted and connected permanently with the continuously running drive and forming a slot with respect to the stationary housing part, the width of the slot peripherally varying in uniform distribution, and a first ring made of electrically conducting material projecting into the slot, the ring being jointly rotatably connected with the power take-off axle.

2. The device as set forth in claim 1, wherein said rotating housing part and said stationary housing part have sections thereof respectively overlapping each other.

3. The device as set forth in claim 2, wherein said sections extend axially parallel.

4. The device as set forth in claim 1, wherein said brake mechanism comprises, a second ring made of electrically conducting material extending opposite to and being mounted jointly rotatable with the first ring, the latter projecting axially parallel into said slot, a second annular magnet arranged concentrically to the axis of the accumulator, an annular stationary housing, said second annular magnet being disposed in said stationary housing, and said stationary housing forms a second slot, said second ring projecting into said second slot, said slot having a width varying in peripheral direction, said second annular magnet having a winding which is connectable to the voltage source alternately with the winding of the first-mentioned annular magnet of the coupling mechanism, and said winding of said second annular magnet being connected to the sensing device for operating the brake mechanism.

5. The device as set forth in claim 1, wherein the varying of the slot width comprises teeth formed on and at a periphery of a radially outwardly directed side of said rotating housing part and teeth spaces formed between said teeth.

6. The device as set forth in claim 4, wherein the varying of the width of the first-mentioned slot comprises teeth formed on and at a periphery of a radially outwardly directed side of said rotating housing part and teeth spaces formed between said teeth, the varying of the width of the second slot comprises teeth formed on and at a periphery of a radially outwardly directed side of said stationary housing and teeth spaces formed between said latter-mentioned teeth.

7. The device as set forth in claim 1, further comprising an rpm counter means for regulating power supply to said annular magnet of the coupling mechanism is coordinated to the power take-off axle.

8. The device as set forth in claim 1, further comprising a pot-shaped carrier is nested into said rotating housing part, the latter and the former are shaped geometrically similarly, said ring is disposed on said pot-shaped carrier, said carrier and said rotating housing part respectively each have a base area constituting means for an axial connection to said power take-off axle and an axle of said drive, respectively.

9. The device as set forth in claim 8, wherein said carrier is made of light matal.

10. The device as set forth in claim 5, wherein said teeth have at their respective free ends a bent-off portion pointing in a direction toward the winding of said annular magnet.

11. The device as set forth in claim 6, wherein said first-mentioned teeth have at their respective free ends a bent-off portion pointing in a direction toward the winding of said first-mentioned annular magnet, said teeth formed on said stationary housing have at their free end a bent-off portion pointing in a direction toward the winding of said second annular magnet.

* * * * *